United States Patent
Eilers et al.

(10) Patent No.: US 11,591,015 B2
(45) Date of Patent: Feb. 28, 2023

(54) METHOD AND ASSEMBLY FOR VALIDITY-CHECKING AND/OR (RE)INITIALIZING REAR WHEEL STEERING

(71) Applicant: ZF Friedrichshafen AG, Friedrichshafen (DE)

(72) Inventors: Hubertus Eilers, Hilter a.T.W. (DE); Ulf Beering, Melle (DE); Dominik Vogt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 321 days.

(21) Appl. No.: 16/609,245

(22) PCT Filed: Apr. 26, 2018

(86) PCT No.: PCT/EP2018/060768
§ 371 (c)(1),
(2) Date: Oct. 29, 2019

(87) PCT Pub. No.: WO2018/219562
PCT Pub. Date: Dec. 6, 2018

(65) Prior Publication Data
US 2020/0079425 A1    Mar. 12, 2020

(30) Foreign Application Priority Data
May 31, 2017  (DE) ............... 10 2017 209 231.9

(51) Int. Cl.
*B62D 7/15* (2006.01)
*B62D 15/02* (2006.01)
(Continued)

(52) U.S. Cl.
CPC ........... *B62D 7/159* (2013.01); *B62D 15/021* (2013.01); *B62D 15/0245* (2013.01);
(Continued)

(58) Field of Classification Search
CPC .. B62D 7/159; B62D 15/021; B62D 15/0245; B62D 6/002; B62D 6/02; B62D 15/024; B60T 2260/022; B60W 2420/52
See application file for complete search history.

(56) References Cited

U.S. PATENT DOCUMENTS 6,301,532 B1    10/2001  Kull et al.
2016/0039411 A1*  2/2016  Park ................ G01S 13/931
701/70
(Continued)

FOREIGN PATENT DOCUMENTS

DE    197 20 440 A1    12/1997
DE    197 20 602 A1    1/1998
(Continued)

OTHER PUBLICATIONS

English translated copy of Braun et al. (EP 1486399) (Year: 2004).*
(Continued)

*Primary Examiner* — James M McPherson
*Assistant Examiner* — Kyle J Kingsland
(74) *Attorney, Agent, or Firm* — Finch & Maloney PLLC

(57) ABSTRACT

An assembly for plausibility checking and/or reinitializing a rear wheel steering system of a vehicle having a rear wheel steering unit, which includes at least one rear wheel actuator for adjusting a rear-wheel steering angle and a sensor for detecting the set position of the rear wheel actuator, with at least one reference sensor for detecting a reference signal and with an electronic control unit for carrying out the plausibility check and/or reinitialization of the sensor. The reference sensor is part of a vehicle unit different from the rear wheel steering unit and is designed to detect a vehicle-status-dependent reference signal. Furthermore, the control unit includes at least one mathematical model which, based on the vehicle-status-dependent reference signal, can determine a reference value and/or a reference vehicle status, (Continued)

with which the plausibility check and/or reinitialization can be carried out by the control unit.

18 Claims, 5 Drawing Sheets

(51) Int. Cl.
  *B62D 6/00* (2006.01)
  *B62D 6/02* (2006.01)
(52) U.S. Cl.
  CPC .... *B60T 2260/022* (2013.01); *B60W 2420/52* (2013.01); *B62D 6/002* (2013.01); *B62D 6/02* (2013.01); *B62D 15/024* (2013.01)

(56) References Cited

U.S. PATENT DOCUMENTS

2016/0075373 A1* 3/2016 Fukukawa ........... B62D 15/021
  701/42
2017/0168495 A1* 6/2017 Wood ................. B60W 10/184

FOREIGN PATENT DOCUMENTS

EP   1 010 577 A2    6/2000
EP   1 486 399 A1   12/2004
JP   H06107204 A  *  4/1994

OTHER PUBLICATIONS

Translated copy of Nakamura (JP H06107204) (Year: 1994).*
Certified English translation of Nakamura (JP H06107204). (Year: 1994).*
German Office Action Corresponding to 10 2017 209 231.9 dated Jan. 17, 2018.
International Search Report Corresponding to PCT/EP2018/060768 dated Jul. 17, 2018.
Written Opinion Corresponding to PCT/EP2018/060768 dated Jul. 17, 2018.

* cited by examiner

METHOD AND ASSEMBLY FOR VALIDITY-CHECKING AND/OR (RE)INITIALIZING REAR WHEEL STEERING

This application is a National Stage completion of PCT/EP2018/060768 filed Apr. 26, 2018, which claims priority from German patent application serial no. 10 2017 209 231.9 filed May 31, 2017.

FIELD OF THE INVENTION

The present invention relates to a method and an assembly for plausibility checking and/or (re)initializing a rear wheel steering system of a vehicle.

BACKGROUND OF THE INVENTION

From the prior art, rear wheel steering systems for vehicles are known, which comprise a rear wheel actuator for setting a rear wheel steering angle. To register the set position of the rear wheel actuator, such rear wheel steering systems comprise a sensor which can be arranged in the rear wheel actuator. To be able to check that the sensor is working correctly, the rear wheel steering systems known from the prior art additionally comprise an absolute sensor. Thus, such absolute sensors are used to measure the rear wheel steering angle or the setting of the rear wheel actuator with redundancy, in order to check the correct functioning of the sensor by means of a plausibility assessment procedure. Furthermore, such absolute sensors are used for (re)initializing the rear wheel steering system (zero position or initial position on starting). The sensors used are in particular rotor position sensors, which can detect the position of a rotor of the rear wheel actuator in the range of 360°. After initialization the revolutions through which the rotor moves and/or the rotational direction are stored in a memory of the rear wheel steering system. In the non-energized condition, for example because the vehicle is parked, this information is lost so the absolute position of the rear wheel actuator is no longer known. Accordingly, for reinitialization the absolute sensor is used, by means of which the zero position of the rear wheel actuator can be reinitialized.

This has the disadvantage that for the plausibility check and/or the reinitialization a redundant sensor must necessarily be incorporated in the rear wheel steering system. This increases the manufacturing costs of the rear wheel steering system. A further disadvantage is that the absolute sensor may develop a fault and because of that the reinitialization cannot be carried out.

SUMMARY OF THE INVENTION

Thus, an objective of the present invention is to provide a method and an assembly by virtue of which the above disadvantages can be overcome.

An assembly for the plausibility checking and/or reinitialization of a rear wheel steering system of a vehicle is proposed. The assembly comprises a rear wheel steering unit which has at least one rear wheel actuator for setting a rear wheel steering angle at the rear axle and a sensor for detecting the set position of the rear wheel actuator. In addition the assembly comprises at least one reference sensor system for picking up a reference signal, and an electronic control unit for carrying out the plausibility check and/or the reinitializing of the sensor of the rear wheel actuator. In this case the reference sensor system consists of at least one sensor which, according to the invention, is part of another, separate unit of the vehicle as opposed to the rear wheel steering unit itself, and is therefore not part of the rear axle steering system. The reference sensor system can thus contain, besides the sensor, further components for evaluating the sensor or its signals.

Furthermore, the reference sensor system is designed to register a reference signal that depends on the status of the vehicle. With reference to the reference signal, a conclusion can be drawn about the current driving situation of the vehicle. With this reference value and/or reference vehicle status the control unit can carry out the plausibility check and/or the reinitialization. Thus, the rear wheel steering unit does not need any further redundant sensor in order to check the plausibility and correct functioning of the existing sensor and/or to reinitialize it. Instead, for these functionalities other sensors already present in the vehicle can be used, which are not part of the rear wheel steering unit but of some other unit of the vehicle. In that way the assembly can be made cost-effectively since at least one sensor in the rear wheel actuator or the rear wheel steering system can be saved.

The control unit comprises at least one mathematical model. The mathematical model is designed so that by means of it and with reference to the at least one reference signal that depends on the status of the vehicle, a reference value and/or a reference vehicle status can be determined. It is advantageous if the reference value and/or the reference vehicle status can be estimated or calculated by means of the mathematical model. In that way the sensor does not have to directly detect the position of the rear wheel actuator. Instead, an indirect detection of other reference signals is possible, by virtue of which and with reference to the mathematical model the corresponding reference value and/or reference status of the vehicle can be determined.

Preferably, as the reference sensor system the assembly can comprise one or more optical or magnetic field detecting sensors, which as part of a driver-assistance system monitor the near surroundings of the vehicle. For example, as a sensor or sensors of the reference sensor system one or more cameras and/or radar and/or lidar sensors can be used, which are orientated on the driving lanes or boundaries of a road. In that way a reference signal, a reference value and/or a reference vehicle condition that depends on the status of the vehicle can be determined. In other words, the orientation of the vehicle relative to the road can be detected. For example from the camera data that register the environment of the vehicle, in particular with the help of image processing, the distance of the vehicle at least ahead and behind to a driving lane boundary (centerline, lateral boundary) can be determined. Preferably, from the data of the optical sensors the control unit can determine the driving direction, the driving speed and accelerations in the transverse and longitudinal directions, and also in the vertical axis of the vehicle. From this, besides the momentary orientation of the vehicle within the driving lane and its momentary movement and/or acceleration relative to the road, a calculable prediction can be obtained of the current and future position of the vehicle. Alternatively or in addition, the detection of the vehicle's status can in particular be used in combination with GPS position data detected by a driver-assistance system, or even car-to-car or car-to-X information. Likewise, data present in a navigation unit of the vehicle can be used by the driver-assistance system to detect the situation of the vehicle. In particular, this is real-time data processed by the system.

The assembly can be made inexpensively if the reference sensor system is part of a drive stability unit, in particular an ESP system. The abbreviation "ESP" is understood to mean an Electronic Stability Program known from the prior art. Alternatively or in addition, the reference sensor system can be part of a driver-assistance system. Driver-assistance systems make it possible to take over at least some tasks of the driver. These range, for example, from keeping in lane to fully autonomous driving. Such units have sensors used to monitor and detect vehicle situations. For example they enable the detection of speeds, accelerations or even rotational rates about various axes of the vehicle. Further sensors have already been described earlier for reference sensor systems in driver-assistance systems.

The assembly can in particular be made inexpensively if the control unit containing the mathematical model is a control unit of the rear wheel steering unit and/or a remote control unit, in particular of the drive stability unit or of a driver-assistance system. In such a case the assembly does not need any separate, further control unit. Instead, the system can have recourse to control units already present. The control unit of the rear axle steering system can evaluate the aforesaid reference signals if these are interconnected. The reference signal from the remote control unit can also be evaluated and delivered to the control unit of the rear axle steering system by way of known signal paths such as CAN bus or similar. Data exchange or signal transmission can also take place by wireless means.

Plausibility checking and reinitialization can be carried out particularly inexpensively and accurately if by means of the mathematical model, for the plausibility check a reference front-wheel steering angle and/or for the reinitialization a reference rear-wheel steering angle can be determined as reference values.

The mathematical model can be created particularly simply if, by means of it, starting of the vehicle in a straight line can be determined as the reference vehicle status for the plausibility check and/or the reinitialization.

It is also advantageous for the assembly to comprise an actual-value sensor for determining an actual value. Preferably, with the actual-value sensor an actual front-wheel steering angle and/or an actual rear-wheel steering angle can be determined for the plausibility check and/or the reinitialization. The plausibility check and/or the reinitialization can be carried out very simply with reference to these actual values.

For the same reasons it is also advantageous for the actual-value sensor to be a front-wheel steering angle sensor for determining the actual front-wheel steering angle. In this case the front-wheel steering angle sensor is in particular part of the other vehicle unit that is different from the rear wheel steering system. In addition or alternatively, it is advantageous for the actual-value sensor to be a rear-wheel steering angle sensor for determining the actual rear-wheel steering angle. The rear-wheel steering angle sensor is preferably part of the rear axle, in order to determine the angle of the wheel carrier relative to the rear axle. It is therefore part of the rear wheel steering unit, or a separate or other vehicle unit.

It is advantageous for the reference value and/or reference vehicle status that can be determined by the control unit for the plausibility check and/or the reinitialization, to be able to be compared with the actual value detected by the actual-value sensor. Moreover, it is advantageous if by virtue of this comparison a result value and/or a comparison result can be provided by the control unit.

To carry out the plausibility check it is advantageous if, by means of the control unit and when starting off in a straight line is the reference status of the vehicle, it can be checked whether the actual front-wheel steering angle has a result value of zero.

For the plausibility check its is also advantageous if it can be checked by means of the control unit whether the actual front-wheel steering angle differs from the reference front-wheel steering angle or whether a result of zero is obtained.

For the plausibility check it is also advantageous if, with a result value equal to zero as the comparison value, the control unit can conclude that "the sensor is not faulty", or in other words that it is functioning correctly. With a result value equal to zero a "sensor fault" can be determined. For the reinitialization it is advantageous for the control unit to be designed such that by means of it, when starting straight ahead is established as the reference status of the vehicle, it can be checked whether the actual front-wheel steering angle has the result value zero and the front wheels are therefore orientated parallel to the longitudinal axis of the vehicle.

Furthermore, for the reinitialization it is advantageous for the control unit to be able to check whether the reference rear-wheel steering angle differs from the actual rear-wheel steering angle, or whether a result value of zero is obtained.

In addition, for the reinitialization it is advantageous if, by means of the control unit, when the comparison result gives a result value of zero the sensor can be identified as reinitialized, and when the result value corresponds to a difference a non-initialized sensor can be identified.

Furthermore, for reinitializing the sensor it is advantageous if, by means of the control unit, the difference observed can be stored as an offset correction value for the sensor in a first memory, in particular a RAM, and/or used. A RAM is a volatile memory which loses all its data when its power is cut off. Alternatively an EEPROM can be used as the first memory.

It is advantageous for the rear wheel actuator to comprise an electric motor with a rotor that can rotate about a rotational axis for adjusting the rear-wheel steering angle. In addition or alternatively, it is advantageous for the sensor to be a rotor position sensor, by means of which, in a sensor detection range which in particular covers 360°, i.e. a full revolution, the rotor position of the rear wheel actuator can be detected.

It is advantageous if, by means of the control unit, in the context of reinitialization, after a rough initialization carried out by determining the offset correction value, an additional fine initialization within the sensor's detection range can be carried out. In that way, during the reinitialization the accuracy can be greatly improved.

In this connection it is advantageous for the assembly to comprise a second memory, in particular a ROM, preferably an EEPROM. The distinguishing feature of a ROM is that when not energized it does not lose any data. The second memory is preferably designed such that a rotor multi-position within the sensor detection range is permanently stored in it. In addition or alternatively, it is advantageous if the rotor position sensor is finely initialized by the control unit with reference to the stored rotor multi-position. An EEPROM (English abbreviation for "Electrically Erasable Programmable Read-Only Memory") is an electrically erasable, programmable read-only memory. This is a non-volatile electronic memory module whose stored memory can be erased electrically. Thus, the data stored therein remain in it even when the on-board voltage of the vehicle is switched off.

Furthermore, a method is proposed for plausibility checking and/or reinitializing of a rear wheel steering system of a vehicle. The method is carried out with the aid of an assembly according to the above description, wherein the features mentioned can be present individually or in any desired combination. The method is characterized by the following steps, although the sequence of the steps can be arbitrary: detection of a set position of a rear wheel actuator by means of a sensor of the rear wheel steering system, in particular a rotor position sensor of a servomotor or actuator; detection of a reference signal that depends on the status of the vehicle by means of a reference sensor system; determination of a reference value and/or a reference vehicle status, wherein a control unit carries out the plausibility check and/or the reinitialization and evaluates signals from the reference sensor system. On the structures of process sequences reference should be made to the description of example embodiments with the associated FIGS. 2 to 8.

By virtue of the method the rear wheel steering unit can work without an additional absolute sensor as was required previously, since sensors separate from the rear wheel steering system and already present in the vehicle can be used and evaluated in order to be able to carry out, in a control unit, a corresponding plausibility check and/or reinitialization of the rear wheel steering system of the vehicle. In that way the method for plausibility checking and/or reinitialization of the rear wheel steering system can be made very effective, simple and therefore inexpensive.

Moreover, the invention relates to a control unit in which a mathematical model of a vehicle can be implemented. The model can be designed as a single-track or multiple-track model and takes into account, among other things, steering angles, torques, forces and accelerations and speeds of the wheels and of the vehicle. The linear single-track model is the simplest model presentation for explaining the stationary and non-stationary transverse dynamics of two-track vehicles, which is used for example in ESP control units where, for example, it is used for recognizing a driver's wish. The control unit comprises at least one memory in which data and values from signal emitters such as sensors can be stored. Preferably RAM and ROM memories are present and with reference to the data or signals provided the control unit can make estimates and/or calculations, in order to be able to carry out plausibility checks and/or reinitializations from the aforesaid reference signals.

BRIEF DESCRIPTION OF THE DRAWINGS

Below, the invention is explained in greater detail with reference to drawings, which show.

DETAILED DESCRIPTION OF THE PREFERRED EMBODIMENTS

Figure 1:
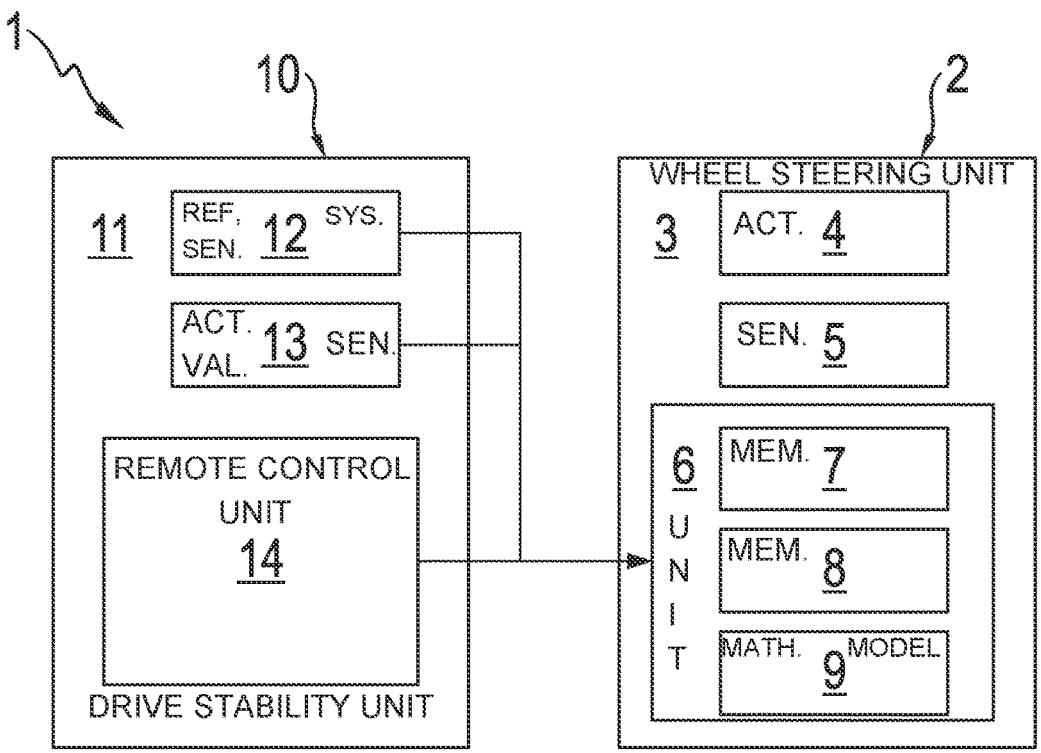
FIG. 1: A schematic representation of an assembly for the plausibility checking and/or reinitialization of a rear wheel steering system of a vehicle.
Figure 7:
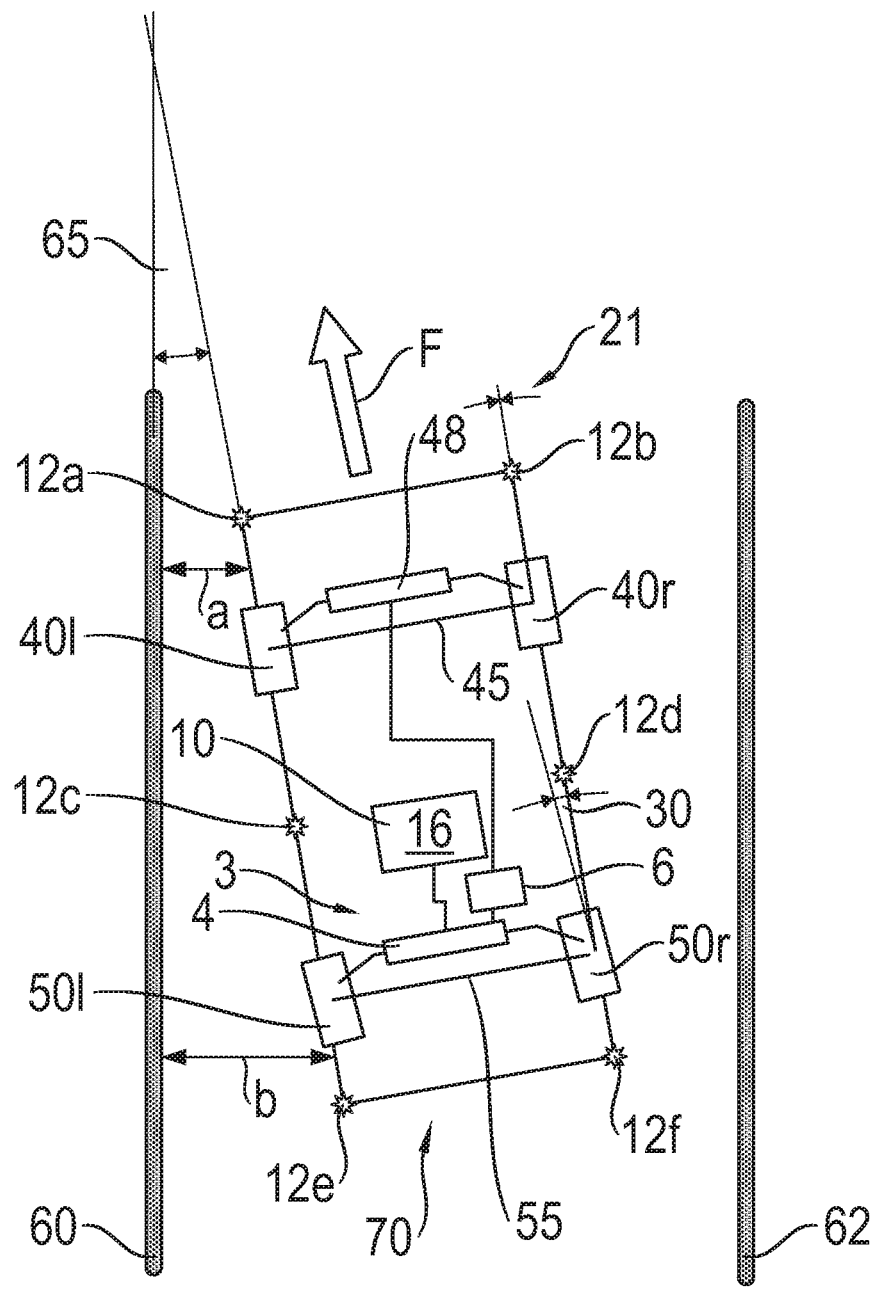
FIG. 7: A schematic representation of a vehicle in a first driving situation.
Figure 8:
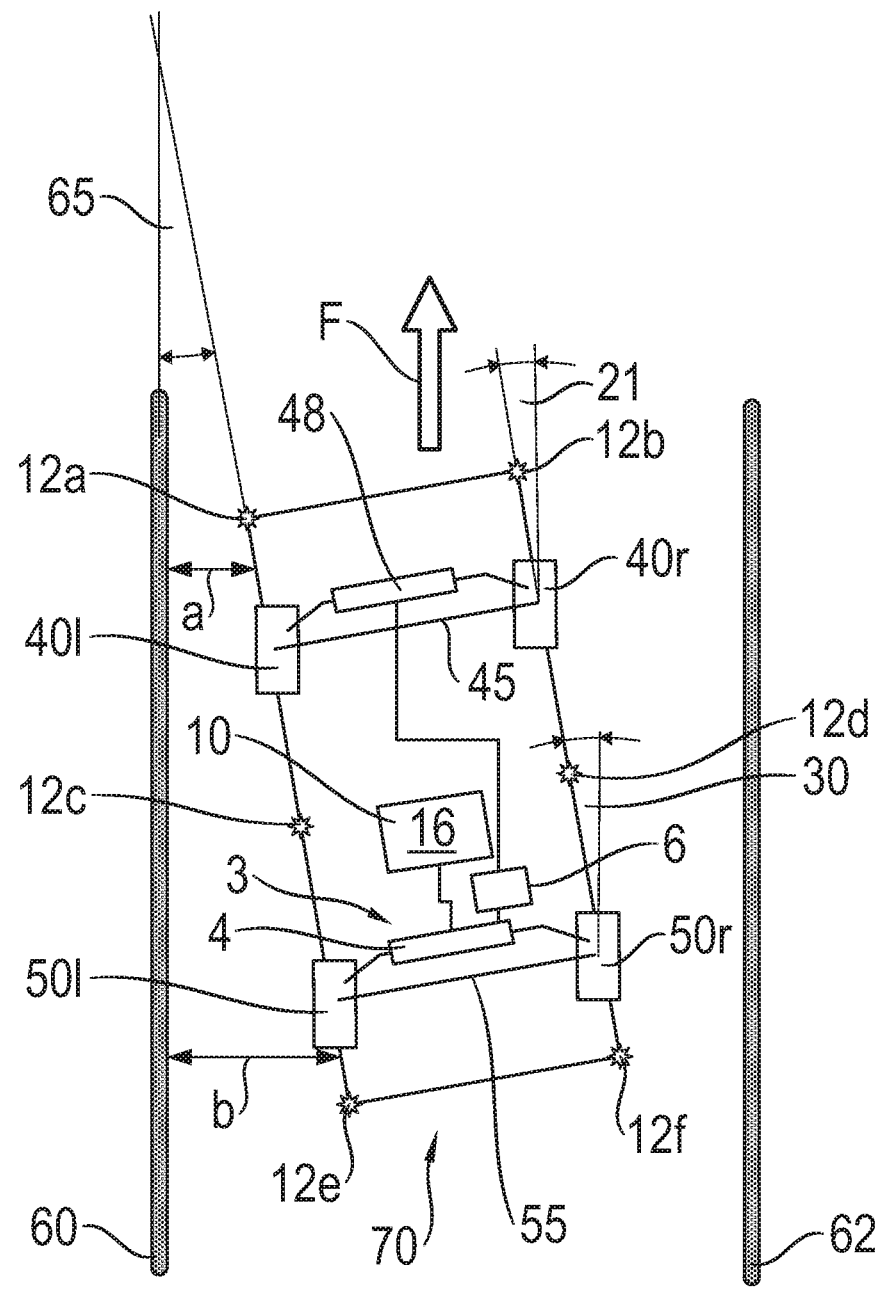
FIG. 8: A schematic representation of a vehicle in a further driving situation.

FIG. 1 shows schematically an assembly 1 for the plausibility checking and/or reinitialization of a rear wheel steering system in a vehicle 70 represented in FIG. 7 or 8. The assembly 1 comprises two vehicle units 2, 10. The first vehicle unit 2 is in this case a rear wheel steering unit 3. By means of this a rear-wheel steering angle of at least one rear wheel of the vehicle can be set. The rear wheel steering unit 3 comprises a rear wheel actuator 4 by way of which the rear-wheel steering angle can be set. In addition the rear wheel steering unit 3 comprises a sensor 5. With this sensor 5 the set position of the rear wheel actuator 4 can be detected. In addition the rear wheel steering unit 3 comprises a rear wheel control unit 6 which receives from the sensor 5 a transmitted sensor signal (for example a rotor position) and with reference to that signal can control the rear wheel actuator 4 so that it sets the desired rear-wheel steering angle.

In addition the assembly 1 comprises a first memory 7. The first memory 7 is in the form of a RAM. Furthermore the assembly 1 comprises a second memory 8. This is in the form of a ROM. According to this example embodiment the rear wheel steering unit 3 contains the first and second memories 7, 8. These are also preferably part of the rear wheel control unit 6.

As already mentioned earlier, the assembly 1 comprises a second vehicle unit 10 different from the rear wheel steering system. In this case the second vehicle unit 10 is in particular in the form of a drive stability unit 11 and is separate from the rear axle steering system. The drive stability unit 11 is here preferably an ESP system which stabilizes the vehicle in critical driving situations by the selective braking of individual wheels. The ESP system comprises sensors, which detect speeds, rotational rates and/or accelerations about various axes of the vehicle.

The second vehicle unit 10 comprises a reference sensor system 12. The reference sensor system 12 is used within the second vehicle unit 10 in order to be able correspondingly carry out the partial task assigned to the second vehicle unit 10. Thus, the reference sensor system 12 is external to the rear wheel steering unit 3, i.e. it comprises at least one sensor which is not part of the rear wheel steering unit 3. The reference sensor system 12 detects a reference signal 16 (see FIGS. 2 to 8) which depends on the status of the vehicle. The phrase "depends on the status of the vehicle" in this connection means that with reference to the reference signal 16 a conclusion can be drawn directly or indirectly about the drive dynamic status of the vehicle. Thus, the at least one reference signal 16 that depends on the status of the vehicle can be, for example, the speed or rotational rate of at least one wheel or tire. In addition or alternatively, GPS data, the yaw rate of the vehicle, the longitudinal acceleration and/or the transverse acceleration of the vehicle can produce a reference signal 16 that depends on the status of the vehicle. According to FIG. 1 the sensor of the reference sensor system 12 is part of the second vehicle unit 10.

Moreover, the assembly 1 comprises an actual-value sensor 13. Preferably, by virtue of the actual-value sensor 13 information that depends on the status of the vehicle can also be detected. As shown in FIG. 1 the actual-value sensor 13 is incorporated in the second vehicle unit 10. In addition or alternatively, however, the actual-value sensor 13 can also likewise be incorporated in the first vehicle unit 2. According to FIG. 1 the second vehicle unit 10 also comprises a remote control unit 14. This can be an ESP control unit that obtains information from a variety of sensors in the vehicle and controls actuators in the vehicle, for example brakes and front and/or rear wheel systems, in order to mitigate critical driving situations.

According to FIG. 1 the assembly 1 also incorporates a mathematical model 9. The mathematical model 9 is incorporated in at least one of the two vehicle units 2, 10, in particular in one of the control units 6, 14, or is implemented in one of those control units. In the present example embodiment the rear wheel control unit 6 of the rear wheel steering unit 3 comprises the mathematical model 9. Alternatively, however, it could just as well be implemented in the remote control unit 14 and applied therein.

The mathematical model 9 is designed such that by means of it and with reference to the reference signal 16 from the reference sensor 12, that depends on the status of the vehicle, a reference value 17 and/or a reference vehicle status 18 can be determined, in particular estimated and/or calculated. The control unit 6, 14 of the assembly 1, in particular the rear wheel control unit 6, is designed such that with reference to the reference value 17 and/or reference vehicle status 18 it can carry out a plausibility check and/or reinitialization of the sensor 5. How that plausibility check and/or reinitialization takes place will be fully explained in detail in the description that follows (see FIGS. 2 to 8).

Since the rear wheel steering unit 3 makes use of a sensor of some other vehicle unit 10, an absolute sensor can advantageously be saved (and is therefore not shown) within the rear wheel steering unit 3. Advantageously, the assembly 1 can therefore be made more cheaply.

Figure 2:
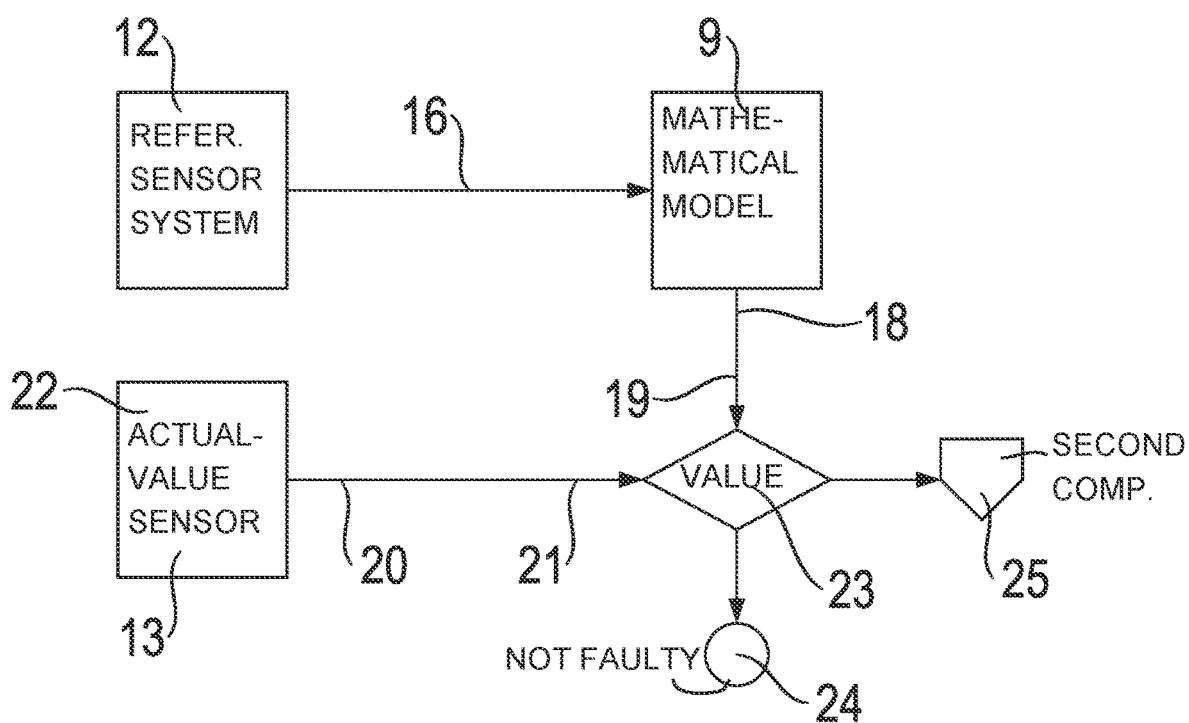
FIG. 2: A flow diagram of the mode of operation of an assembly for checking the plausibility of the rear wheel steering system of the vehicle, according to a first example embodiment.
Figure 3:
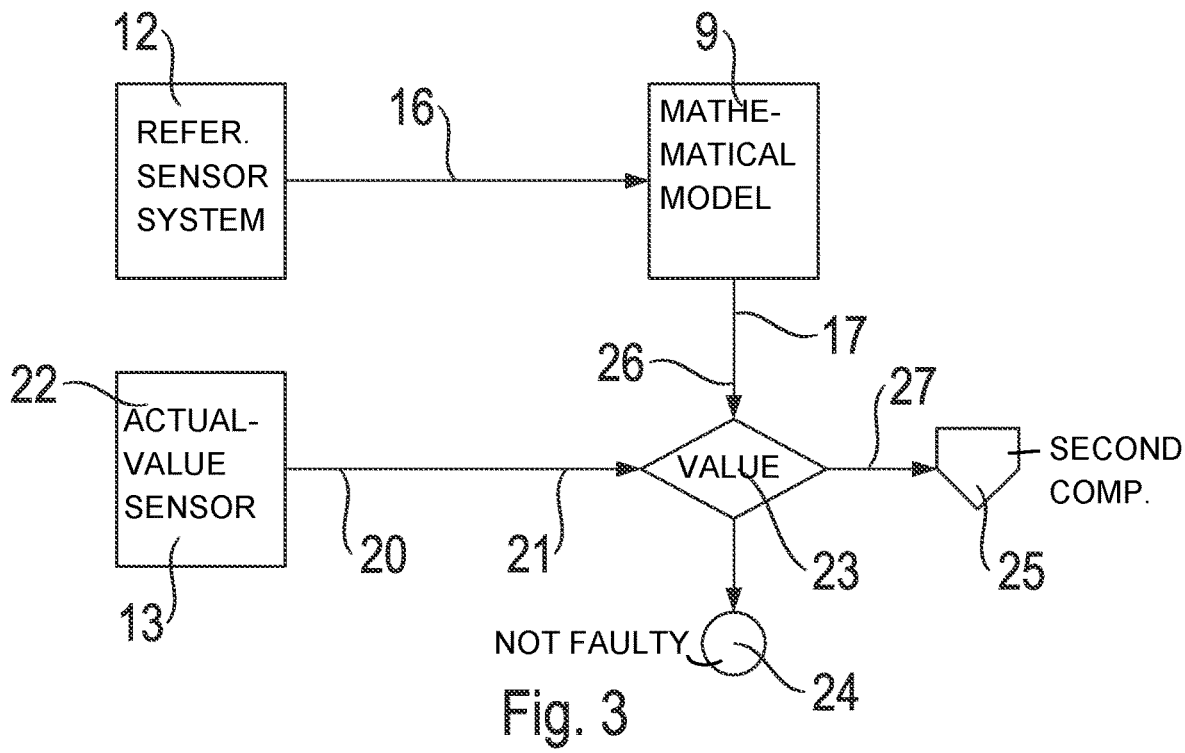
FIG. 3: A flow diagram of the mode of operation of an assembly for checking the plausibility of the rear wheel steering system of the vehicle, according to a second example embodiment.

FIGS. 2 and 3 show two different example embodiments of methods for plausibility checking of the sensor 5. Thus, in accordance with a first example embodiment FIG. 2 shows a simplified flow diagram for checking the plausibility of the rear wheel steering system. According to this, first of all, by way of the reference sensor system 12 external to the rear wheel steering unit 3 the reference signal 16 that depends on the status of the vehicle is detected. Preferably, that reference signal 16 is the yaw rate of the vehicle (the rotational rate about the vertical axis of the vehicle), the wheel speed of at least one wheel of the vehicle, GPS data of the vehicle, a longitudinal acceleration of the vehicle and/or at least one transverse acceleration of the vehicle.

According to FIG. 2, the reference signal 16 from the reference sensor 12 that depends on the status of the vehicle is sent to the mathematical model 9. As already mentioned earlier, the mathematical model 9 is preferably in the control unit of the rear wheel steering unit 3, namely the rear wheel control unit 6. Alternatively or in addition the mathematical model 9 can also run on a control unit which is external to the rear wheel steering unit 3. In the present case this is in particular the remote control unit 14, which is part of the second vehicle unit 10 (see FIG. 1).

According to the first example embodiment shown in FIG. 2, for the plausibility check of the rear wheel actuator 4 the mathematical model 9 determines as the reference vehicle status 18 a start of the vehicle straight ahead in a line 19. Besides the reference signal 16 that depends on the status of the vehicle, from which in the present case, with the help of the mathematical model 9 the control unit 6, 14 determines the reference vehicle status 18, the control unit 6, 14 also receives from the sensor 13 an actual value 20. According to the example embodiment shown in FIG. 2, the actual-value sensor 13 supplies an actual front-wheel steering angle 21. Consequently, the actual-value sensor 13 is preferably in the form of a front-wheel steering angle sensor 22.

According to the example embodiment represented in FIG. 2, the control unit 6, 14 then checks during the straight-ahead start 19 of the vehicle taken as the reference vehicle status 18 whether the actual front-wheel steering angle 21 has a result value 23 equal to zero. For the plausibility check, with a result value 23 equal to zero the control unit 6, 14 can determine as a first comparison result 24 that the sensor 5 is not faulty, i.e. that the sensor 5 is working correctly. If the result value 23 is not equal to zero, the control unit 6, 14 can adopt as a second comparison result 25 an offset correction, or it can conclude that the sensor 5 is faulty. In the latter case the rear axle steering system would be switched off and moved to a neutral position (steering angle at the rear axle equal to zero), and the faulty sensor 5 of the rear wheel steering unit 3 must be replaced.

FIG. 3 shows a further example embodiment of how the assembly 1 can carry out a plausibility check of the sensor 5 of the rear wheel steering unit 3. As in the example embodiment shown in FIG. 2, from at least one reference sensor 12 of the assembly 1 at least one reference signal 16 that depends on the status of the vehicle is detected and transmitted to the at least one control unit 6, 14 incorporating the mathematical model 9. Otherwise than in the example embodiment shown in FIG. 2, according to the example embodiment shown in FIG. 3 the mathematical model 9 determines, in particular estimates and/or calculates, not a reference vehicle status 18 but, rather, a reference value 17. In the present example embodiment the reference value 17 is a reference front-wheel steering angle 26. With reference to the vehicle-status-dependent reference signal 16, the mathematical model 9 then determines what the reference front-wheel steering angle 26 of the vehicle should be in the current driving situation.

To be able to make a comparison, the control unit 6, 14 containing the mathematical model 9, as also in the example embodiment shown in FIG. 2, contains an actual value 20 supplied by the actual-value sensor 13. The actual-value sensor 13 is a vehicle sensor which can be part of the rear wheel steering unit 3 or, however, even of some other vehicle unit 10. Preferably, the actual-value sensor 13 also detects a signal that depends on the status of the vehicle, which forms the actual value 20. According to the example embodiment shown in FIG. 3 the actual value 20 is the actual front-wheel steering angle 21, as it also is in the example embodiment shown in FIG. 2.

The control unit 6, 14 compares the sensor-determined actual front-wheel steering angle 21 against the reference front-wheel steering angle 26 determined by the mathematical model 9. The result value 23 can be equal or not equal to zero. If according to a first comparison result 24 the actual front-wheel steering angle 21 is equal to the reference front-wheel steering angle 26, the control unit 6, 14 determines as a first comparison result 24 that the sensor 5 is working correctly. However, if a difference 27 is found between the actual front-wheel steering angle 21 and the reference front-wheel steering angle 26, then as a second comparison result 25 an offset correction is adopted or it is concluded that the sensor 5 is decalibrated or faulty. In the latter case the defective sensor 5 must be replaced.

Thus, in the example embodiments shown in FIGS. 2 and 3, to check the sensor 5 an additional, separate sensor in the rear wheel steering unit 3 can be saved. Instead, to determine the reference signal 16 that depends on the status of the vehicle other sensors already present in the vehicle can be used, namely ones in the reference sensor system 12, in order, in combination with the mathematical model 9 stored in the control unit 6, 14, to be able to carry out a check of the sensor 5 (in particular a rotor position sensor).

Figure 4:
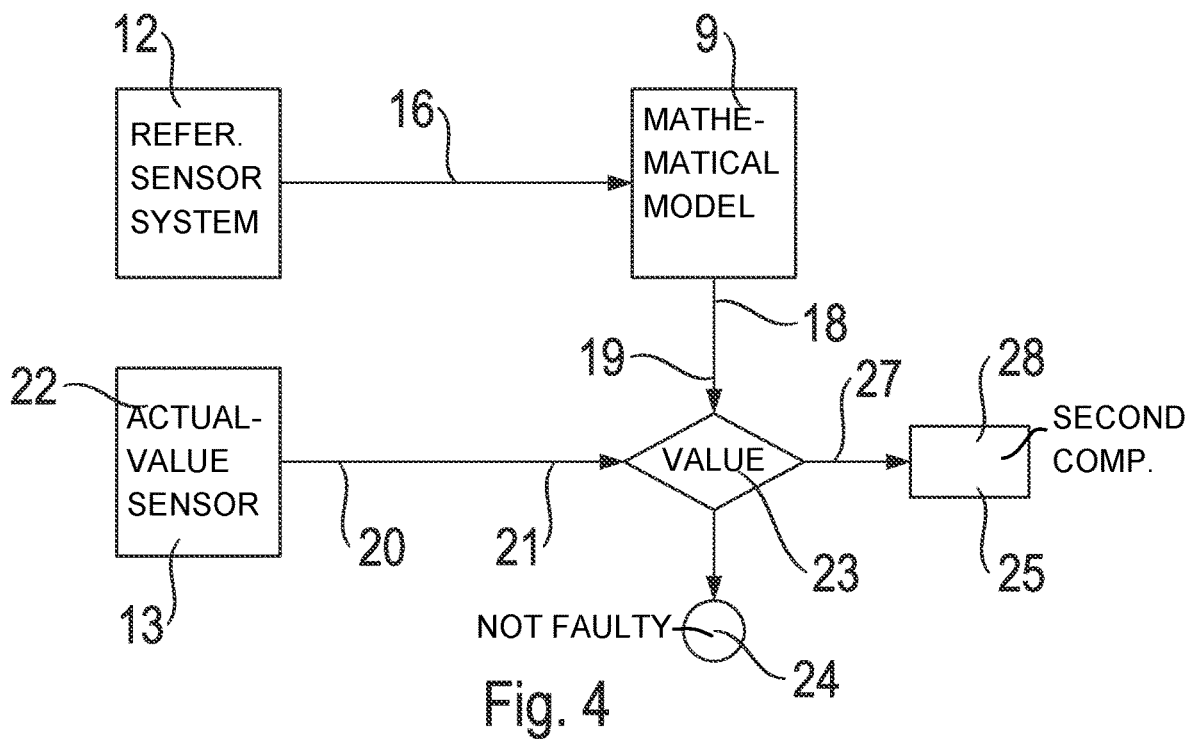
FIG. 4: A flow diagram of the mode of operation of an assembly for reinitializing the rear wheel steering system of the vehicle, according to a first example embodiment.
Figure 5:
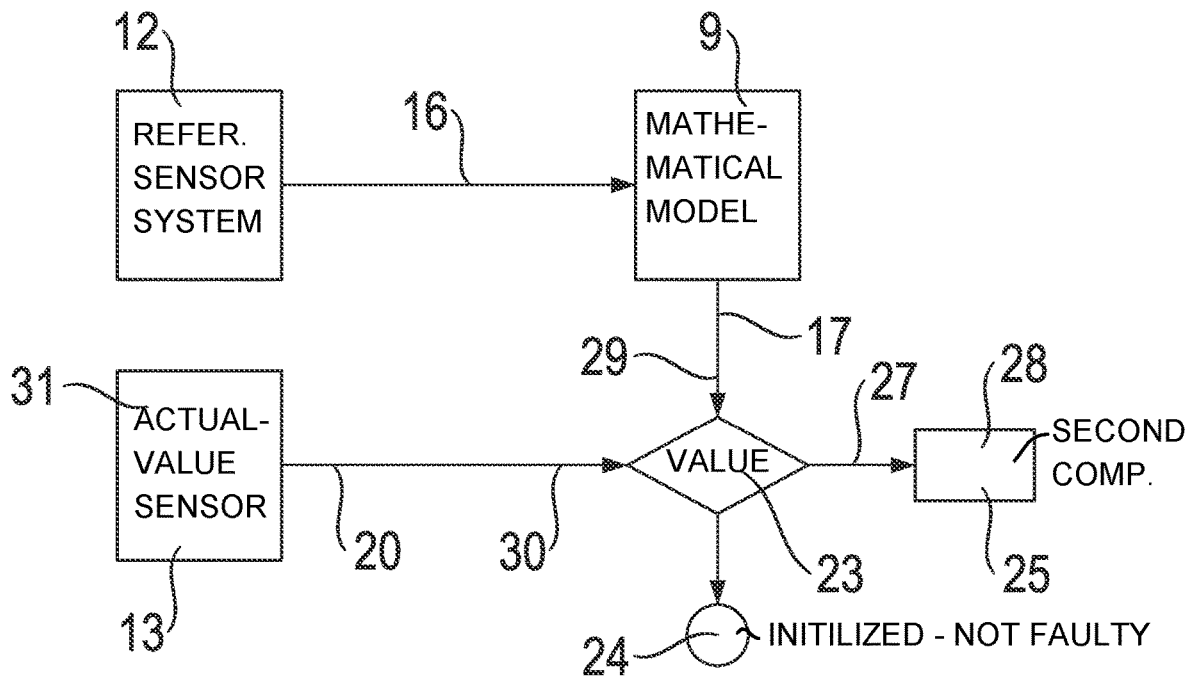
FIG. 5: A flow diagram of the mode of operation of an assembly for reinitializing the rear wheel steering system of the vehicle, according to a second example embodiment.

In addition or alternatively, the mathematical model 9 or the control unit 6, 14 containing the mathematical model 9 can be designed such that by means of it a reinitialization of the rear wheel steering system of the vehicle, in particular of the sensor 5, can be carried out. FIGS. 4 and 5 show two example embodiments of how such a reinitialization can be carried out.

According to the example embodiment shown in FIG. 4, as also in the case of the example embodiments shown in FIGS. 2 and 3 the control unit 6, 14 receives a reference signal 16 from the reference sensor system 12. In this case too the sensor of the reference sensor system 12 is not part of the rear wheel steering unit 3, but rather, a sensor belonging to some other vehicle unit 10, in particular the drive stability unit 11. As also in the example embodiment shown in FIG. 2, with reference to the at least one reference signal 16 that depends on the status of the vehicle the mathematical model 9 can determine whether the vehicle is starting off in a straight line. Then, the mathematical model 9 determines as the reference vehicle status 18 a straight-ahead start 19 of the vehicle with reference to the vehicle-status-dependent reference signal 16 delivered by the reference sensor system 12.

Furthermore, according to the example embodiment represented in FIG. 4—as also in the case of the plausibility check according to the example embodiment represented in FIG. 2—the control unit 6, 14 uses as the actual value 20 the actual front-wheel steering angle 21. Consequently, the actual-value sensor 13 is in this case too preferably a front-wheel steering angle sensor 22.

If a straight-ahead start 19 is confirmed the control unit 6, 14 checks whether the actual front-wheel steering angle 21 is equal to zero in accordance with the result value 23. If the straight-ahead start 19 is confirmed, then with the reinitialized sensor 5 the actual front-wheel steering angle 21 should be equal to zero. In accordance with a first comparison result 24, if the control unit 6, 14 cannot detect any deviation of the actual front-wheel steering angle 21 from zero, in particular within a tolerance range, then the sensor 5 has been initialized and/or calibrated (as when the steering system is installed). However, if as a second comparison result 25 a deviation of the actual front-wheel steering angle 21 from zero or a difference 27 can be detected, then the second comparison result 25 is that the sensor 5 is decalibrated.

To reinitialize the sensor 5 found to be decalibrated, the control unit 6, 14 uses the difference 27 found as an offset correction value 28 for the sensor 5. This offset correction value 28 is preferably stored in the first memory 7, which is preferably in the form of a RAM (see FIG. 1). Thus, this stored offset correction value 28 is used or taken into account by the control unit 6, 14 so that the zero position of the rear wheel actuator 4 is determined, in particular within a tolerance range.

In the example embodiment shown in FIG. 4 for reinitializing, the mathematical model 9 is in particular part of the rear wheel steering unit 3. Consequently, the mathematical model 9 is preferably stored in the rear wheel control unit 6 and is implemented in it.

In addition or alternatively the sensor 5 can be reinitialized in accordance with the example embodiment represented in FIG. 5. In this case, with reference to the at least one vehicle-status-dependent reference signal 16 the mathematical model 9—or the control unit 6, 14 using the mathematical model 9—determines as a reference value 17 a reference rear-wheel steering angle 29. For comparison purposes the control unit 6, 14 uses as the actual value 20 an actual rear-wheel steering angle 30. This is supplied to the control unit 6, 14 by the actual-value sensor 13. According to the present example embodiment the actual-value sensor 13 is preferably a rear-wheel steering angle sensor 31. This rear-wheel steering angle sensor 31 is preferably part of a vehicle unit 10 which is remote in relation to the rear wheel steering unit 3. In addition or alternatively, however, the rear-wheel steering angle sensor 31 can also be part of the rear wheel steering unit 3.

According to FIG. 5 the control unit 6, 14 checks whether there is a difference 27 between the actual rear-wheel steering angle 30 determined by the sensor and the reference rear-wheel steering angle 29 calculated and/or estimated by the mathematical model 9. If the rear-wheel steering angle 30 and the reference rear-wheel steering angle 29 are the same so that there is no difference 27, in particular within a tolerance range, then as the first comparison result 24 it is taken that the sensor 5 has been initialized, at least within the given tolerance range.

If there is a difference 27, then it is established as the second comparison result 25 that the sensor 5 is decalibrated or has not yet been reinitialized. Accordingly, to reinitialize the sensor 5 the difference 27 found between the reference rear wheel steering angle 29 and the actual rear wheel steering angle 30 is used as an offset correction value 28. For this, the offset correction value 28 determined is preferably stored in the RAM of the assembly 1. This preferably takes place in a memory of the second vehicle unit 10 (not shown here). Consequently, it is advantageous if the mathematical model 9 is also implemented in the control unit of the remote vehicle unit, in the present case in the remote control unit 14. Thereby, a steering signal sent by the second vehicle unit 10, in particular the drive stability unit 11, to the rear wheel steering unit 3 is already corrected in advance, so that the rear wheel steering unit 3 no longer has to carry out a correction independently, but rather, it already contains the corrected steering angle.

Alternatively, however, it is also conceivable that the mathematical model 9 is part of the rear wheel steering unit 3. In that case, according to the example embodiment shown in FIG. 5, a decalibrated or erroneous signal would be sent from the second vehicle unit 10, in particular the drive stability unit 11, to the rear wheel steering unit 3. Only in the rear wheel steering unit 3 would a correction of the erroneous signal be carried out with reference to the offset correction value determined and/or stored therein.

Figure 6:
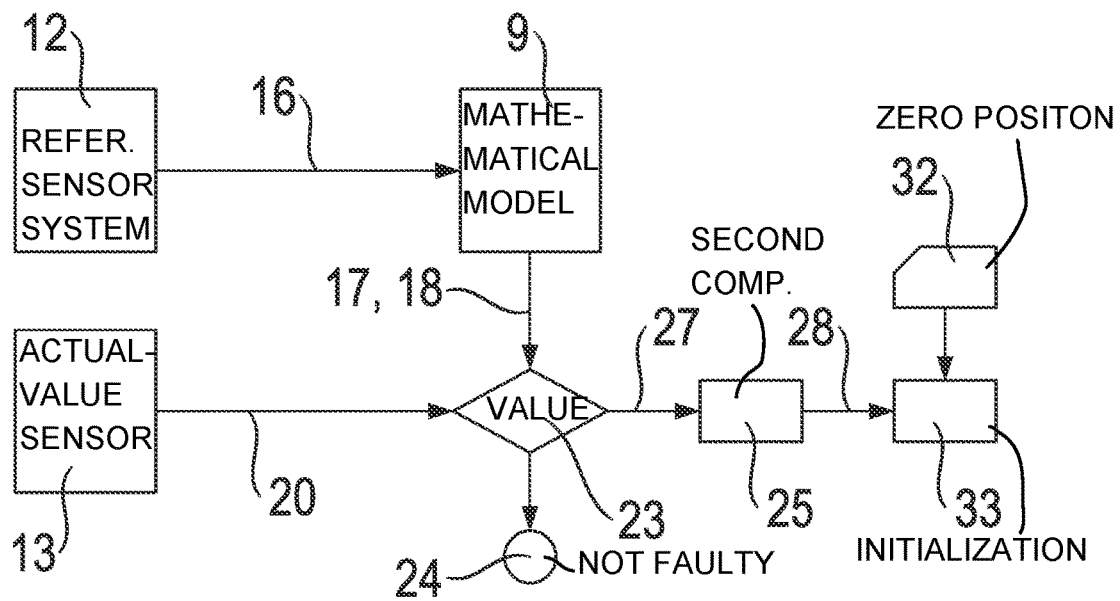
FIG. 6: A flow diagram of the mode of operation of an assembly for reinitializing the rear wheel steering system of the vehicle, according to a third example embodiment.

According to the example embodiments shown in FIGS. 4 and 5, in particular a rough initialization can be carried out. In such a rough initialization the decalibration is not eliminated entirely, but only as far as a predetermined tolerance range. Because of that the rough initialization process shown in FIGS. 4 and 5 can be followed by fine initialization 33, as shown in FIG. 6. This in particular is possible when the rear wheel actuator 4 has a rotor (not shown here) that can rotate about a rotational axis. The rotational movement of the rotor of the rear wheel actuator 4 is converted by an appropriate mechanical system into a linear steering movement of the rear wheel steering system. Preferably the rotational movement of the rotor is changed to linear movement so that an adjustment movement and hence steering of at least one wheel can be carried out. In this case the sensor 5 is in the form of a rotor position sensor. The rotor position sensor can therefore detect the position of the rotor of the rear wheel actuator 4 within a sensor detection range, in particular covering 360°. Thus, if the rotor has been rotated completely several times in one direction, the rotor position sensor cannot determine the absolute steering angle.

By means of the rough initialization described above the zero position of the rotor can be determined to an accuracy of 360°. By means of the subsequent fine initialization 33 the exact rotor zero position can now be determined within the sensor detection range of 360°. For this, a rotor zero position 32 is stored in the second memory 8 of the rear wheel steering unit 3 (see FIG. 1). The rotor zero position 32 determines the position of the rotor of the rear wheel actuator 4 within a complete rotation of 360°.

Thus, according to FIG. 6, first of all during the rough initialization, as the second comparison result 25 the offset correction value 28 is supplied, which can reinitialize the sensor 5 up to one rotation of the rotor of the rear wheel actuator 4. Then, the control unit 6, 14 uses the rotor zero position 32 stored in the ROM during the production and/or assembly of the rear wheel steering unit 3 in order to adjust the rotor exactly within the sensor detection range of 360°. During production, the track at the rear axle is set thereby, so that the steering angle of the wheels on the rear axle enables a straight-ahead start.

FIG. 7 shows schematically a vehicle 70 which is located on a road between road boundaries 60, 62 and is traveling in a forward driving direction F. The vehicle has a front axle 45 and a rear axle 55. Both the front axle and the rear axle are provided with a steering device. On the front axle 45 a front wheel steering unit 48 is shown schematically, in which an actuator can transmit by way of steering rods a steering movement to the wheels 40 *l*, 40 *r*. In this example embodiment the steering angle of the front wheels 40 *l*, 40 *r* is equal to 0 degrees. On the rear axle 55 is arranged a rear wheel steering unit 3, which by means of the rear wheel actuator 4 can transmit a steering movement by way of steering rods to the rear wheels 50 *l*, 50 *r*. The rear wheel steering unit 3 is associated with a rear wheel control unit 6 which, for example, is coupled in signaling communication via a CAN bus signal with the front axle steering unit 48. In this way the steering angle set at the front wheels can be taken into account in the calculation of the rear-wheel steering angle, and conversely. The rear wheel actuator 4 has only one sensor 5 directly associated with or incorporated in the rear wheel actuator 4, in particular a rotor position sensor. The sensor, or the reference sensor system containing the sensor used for plausibility checking or reinitialization, is accommodated in a second vehicle unit 10, which can receive and store its reference signal 16. In the present example embodiment the vehicle 70 has respective lateral front, central and rear environment sensors 12*a-f*, which are in the form of optical sensors. These can be cameras and/or radar and/or lidar sensors, or suchlike. For example, the figure shows that the sensor 12*a* arranged on the left-hand front of the body detects a distance a from the road boundary 60 on the left. At the same time, the centrally arranged sensor 12*c* detects the distance of the vehicle center to the road boundary and the sensor 12*e*, arranged at the rear left end of the vehicle 70, the distance b of the rear end of the vehicle to the road boundary 60. The second vehicle unit 10 evaluates the signals from the sensors 12*a* to *f*. The sensors 12*a, c, e* thus provide real-time information about the distance of the vehicle 70 to the left-hand road boundary 60. At the same time, the sensors 12*b, d, f* give information about the distance of the vehicle 70 from the right-hand road boundary 62. The reference sensor system 12 (*a* to *f*) associated with the second vehicle unit 10 thus constantly gives information about the position where the vehicle 70 is relative to the road boundaries. In the case of determinations at intervals in time, besides the current distance the travel direction and the speed can also be determined. In combination with sensors also associated with the second vehicle unit, such as speed sensors and acceleration sensors, in this example the rear wheel control unit 6 can recognize the current movement of the vehicle relative to the road. In the present example shown in FIG. 7 there is an actual rear-wheel steering angle 30 at the rear axle. Since the actual front-wheel steering angle is equal to zero, the vehicle 70 is approaching the left-hand road boundary 60 along a slightly curved path. Thus, with reference to the signals from the reference sensor system 12, in particular in combination with the mathematical model 9 implemented in the rear wheel control unit 6, the rear wheel control unit 6 recognizes that the vehicle 70 is not driving straight ahead and can therefore determine an offset correction value and also the actual rear wheel steering angle 30 prevailing, which exists at the rear axle 55 and the rear wheels 50*l*, 50*r*. Thus, by virtue of the rear wheel control unit 6 a plausibility check and reinitialization of the sensor 5 of the rear wheel steering unit 3 is enabled.

FIG. 8 also shows a vehicle 70 in a driving situation similar to FIG. 7. Indexes with the same significance will not be explained again here. Otherwise than in FIG. 7, there are steering angles 30, 21 at both the rear axle 55 and the front axle 45. In this case the steering angles 21, 30 at the front and rear axles 45, 55, respectively, are such that the wheels are parallel to one another. Consequently the vehicle 70 is traveling crab-wise, i.e. obliquely with a drift angle 65 relative to the road boundary 60. In other words, the vehicle is traveling in a sense straight and is moving parallel to the road boundary. However, the vehicle's axis is not parallel to the road direction or boundary. It can be seen that with this forward movement of the vehicle 70, the distance detected by the sensors 12*a* on the front carriage and the distance detected by the sensor 12*e* of the rear carriage b from the road boundary 60 remains constant. In combination with the vehicle model 9 implemented in it, the rear wheel control unit 6 recognizes this crab-wise movement and with reference to the angle 65 determined and the actual steering angles 21, 30 at the front and rear axles, it can determine whether the actual rear-wheel steering angle 30 and also the actual front-wheel steering angle detected are the same, or whether the sensor 5 of the rear steering unit 3 has to be reinitialized. If a reinitialization is necessary, the offset correction value is stored and a reinitialization is carried out with reference thereto.

In the above example embodiments, the same indexes have been used for features which, comparing the respective example embodiments above, are identical and/or at least comparable in their design and mode of operation. Insofar as these have not been explained again in detail, their design and/or mode of operation corresponds to the respective previously already described features. Consequently, in particular the way in which the mathematical model 9 works to determine the reference value 17 and/or the reference vehicle status 18 in the above example embodiments is the same. The same applies to the process steps of the control unit 6, 14 for determining one of the two comparison results 24, 25.

INDEXES

1. Assembly
2. First vehicle unit
3. Rear wheel steering unit
4. Rear wheel actuator
5. Sensor
6. Rear wheel control unit
7. First memory
8. Second memory
9. Mathematical model
10. Second vehicle unit
11. Drive stability unit
12. Reference sensor system
12.a-f Sensors of the reference sensor system
13. Actual-value sensor
14. Remote control unit
16. Reference signal
17. Reference value
18. Reference vehicle status
19. Straight-ahead start of the vehicle
20. Actual value
21. Actual front-wheel steering angle
22. Front-wheel steering angle sensor
23. Result value
24. First comparison result
25. Second comparison result
26. Reference front-wheel steering angle
27. Difference
28. Offset correction value
29. Reference rear-wheel steering angle
30. Actual rear-wheel steering angle
31. Rear-wheel steering angle sensor
32. Rotor zero position
33. Fine initialization
40 *l*. Front wheel
40 *r*. Front wheel
45. Front axle
48. Front wheel steering unit
50 *l*. Rear wheel
50 *r*. Rear wheel
55. Rear axle
60. Road boundary
62. Road boundary
65. Angle
70. Vehicle
a. Front carriage distance
b. Rear carriage distance

The invention claimed is:

1. An assembly for performing plausibility checking of a sensor and, in an event that decalibration of the sensor is detected, performing a reinitializing of the sensor of a rear wheel steering system of a vehicle, the assembly comprising:
a rear wheel steering unit with at least one rear wheel actuator for setting a rear-wheel steering angle of a rear axle,
the sensor for detecting a set position of the rear wheel actuator,
at least one reference sensor system for detecting a reference signal, and
an electronic control unit for carrying out the plausibility checking of the sensor and, when the decalibration of the sensor is detected, the electronic control unit performing reinitialization of the sensor of the rear wheel steering system so that the sensor for detecting the set position of the rear wheel actuator again correctly identifies the rear-wheel steering angle of the rear axle and, when recalibration is not possible, determining that the sensor is faulty,
the reference sensor system being part of a vehicle unit, which is separate and distinct from and external to the rear wheel steering unit which is associated with the rear axle, the reference sensor system being designed to detect a reference signal that depends on a status of the vehicle, and, by way of the electronic control unit and with reference to the vehicle-status-dependent reference signal, the electronic control unit determining at least one of a reference value and a reference vehicle status which is compared with an actual value of the sensor of the rear wheel steering system, during the plausibility check of the rear wheel steering system, to determine whether or not the sensor for detecting the set position of the rear wheel actuator is functioning correctly,
the reference sensor system including at least one environment sensor, being positioning on each side of a vehicle incorporating the assembly, for providing real-time information about a distance of the vehicle from left-hand and right-hand boundaries of a road, and each environment sensor being associated with the vehicle unit to assist with performing the plausibility checking and calibration, and
when the electronic control unit determines, during the plausibility check of the sensor, that the sensor is not functioning correctly, the electronic control unit initiates recalibration of the sensor so that, following recalibration of the sensor, the sensor again correctly detects the set position of the rear wheel actuator, while if the sensor is determined by the electronic control unit to be faulty, then the rear axle steering system is switched off.

2. The assembly according to claim 1, wherein the at least one of the reference value and the reference vehicle status is at least one of estimated and calculated by the electronic control unit by a mathematical model.

3. The assembly according to claim 1, wherein the at least one reference sensor positioned on each side of the vehicle comprises at least one optical or magnetic field detecting sensor which is in a form of one of a radar sensor, a lidar sensor or a camera.

4. The assembly according to claim 1, wherein the reference sensor system is part of one of a drive stability unit, an Electronic Stability Program (ESP) system, or a driver-assistance system.

5. The assembly according to claim 2, wherein the electronic control unit, in which the mathematical model is located, is at least one of a rear wheel control unit of the rear wheel steering unit and a remote control unit of a drive stability unit.

6. The assembly according to claim 2, wherein with the mathematical model at least one of a reference front-wheel steering angle is determined as the reference value for the plausibility check, and/or, a reference rear-wheel steering angle is determined as the reference value for the reinitialization.

7. The assembly according to claim 2, wherein with the mathematical model, a straight-ahead start of the vehicle is determined, as the reference vehicle status, for at least one of the plausibility check and the reinitialization of the sensor of a rear wheel steering system.

8. The assembly according to claim 1, wherein the assembly comprises an actual-value sensor for detecting an actual value, and an actual front-wheel steering angle and an actual rear-wheel steering angle are detectable, for at least one of the plausibility check and the reinitialization of the sensor of a rear wheel steering system.

9. The assembly according to claim 8, wherein, for the plausibility check and the reinitialization of the sensor of a rear wheel steering system, at least one of the reference value and the reference vehicle status, that are determinable by a mathematical model, are compared with the actual value that are detectable by the actual-value sensor, and from the comparison at least one of a result value and a comparison result is obtained for determining whether or not the sensor for detecting the set position of the rear wheel actuator is functioning correctly.

10. The assembly according to claim 9, wherein with the electronic control unit, for the plausibility check, when the reference vehicle status is determined as a straight-ahead start, the straight-ahead start is checked whether the actual front-wheel steering angle has the result value has a value of zero.

11. The assembly according to claim 9, wherein, for the plausibility check, the electronic control unit checks either whether the actual front-wheel steering angle is different from a reference front-wheel steering angle or whether the result value has a value of zero.

12. The assembly according to claim 9, wherein, for the plausibility check, with the electronic control unit, with the result value having a value of zero as the comparison result, concludes that the sensor is not faulty, and, if the result value is different from zero, concludes that the sensor is faulty.

13. The assembly according to claim 9, wherein, for the reinitialization, with the electronic control unit, when the reference vehicle status is determined as a straight-ahead start, checks whether the actual front-wheel steering angle has the result value of zero.

14. The assembly according to claim 9, wherein, for the reinitialization, the electronic control unit, either checks whether the actual rear-wheel steering angle is different from the reference rear-wheel steering angle or whether the result value has a value of zero.

15. The assembly according to claim 9, wherein, for the reinitialization, the electronic control unit, with the result value of zero as the comparison result, concludes that the sensor has been reinitialized, and, if the result value shows a difference, concludes that the sensor has not been initialized.

16. The assembly according to claim 15, wherein, to reinitialize the sensor, the difference found as an offset correction value for the sensor is at least one of stored in a first memory, stored in a RAM, and used by the electronic control unit.

17. A method for performing a plausibility checking of a sensor and, in an event that decalibration of the sensor is detected, performing a reinitializing of the sensor of a rear wheel steering system of a vehicle, the method being carried out with an assembly having a rear wheel steering unit with at least one rear wheel actuator for setting a rear-wheel steering angle of a rear axle and a sensor for detecting a set position of the rear wheel actuator, at least one reference sensor system for detecting a reference signal, and an electronic control unit for carrying out the plausibility checking of the sensor and, when the decalibration of the sensor is detected, the electronic control unit performing reinitialization of the sensor of the rear wheel steering system so that the sensor for detecting the set position of the rear wheel actuator again correctly identifies the rear-wheel steering angle of the rear axle and, when recalibration is not possible, determining that the sensor is faulty, the reference sensor system is part of a vehicle unit, which is separate and distinct from and external to the rear wheel steering unit which is associated with the rear axle, the reference sensor system is designed to detect a reference signal that depends on a status of the vehicle, and by way of the electronic control unit and with reference to the vehicle-status-dependent reference signal, the electronic control unit determining at least one of a reference value and a reference vehicle status which is compared with an actual value of the sensor of the rear wheel steering system, during the at least one of the plausibility check of the sensor and the reinitialization of the sensor of the rear wheel steering system is carried out to determine whether or not the sensor for detecting the set position of the rear wheel actuator is functioning correctly, the method comprising:

detecting the set position of the rear wheel actuator via the sensor;

detecting the reference signal that depends on the status of the vehicle by the reference sensor system which is part of the vehicle unit but is separate and distinct from and external to the rear wheel steering unit associated with the rear axle;

determining at least one of a reference value and a reference vehicle status;

providing the reference sensor system including at least one environment sensor, positioning on each side of a vehicle incorporating the assembly, for providing real-time information about a distance of the vehicle from left-hand and right-hand boundaries of a road, with each environment sensor being associated with the vehicle unit to assist with performing the plausibility checking and calibration;

carrying out the plausibility check of the sensor with the electronic control unit by comparing at least one of the reference value and the reference vehicle status, determinable by a mathematical model, with an actual value detected by an actual-value sensor to determine whether or not the sensor for detecting the set position of the rear wheel actuator is functioning correctly; and when the electronic control unit determines, during the plausibility check of the sensor, that the sensor is not functioning correctly, initiating a rough and a fine recalibration of the sensor, via the electronic control unit, so that, following the rough and the fine recalibrations of the sensor, the sensor again correctly detects the set position of the rear wheel actuator, while if the sensor is determined by the electronic control unit to be faulty, then the rear axle steering system is switched off.

18. An assembly for performing plausibility checking of a sensor and, in an event that decalibration of the sensor is detected, performing a reinitializing of the sensor of a rear wheel steering system of a vehicle, the assembly comprising:

a rear wheel steering unit with at least one rear wheel actuator for setting a rear-wheel steering angle of a rear axle, the sensor for detecting a set position of the rear wheel actuator, at least one reference sensor system for detecting a reference signal, an electronic control unit for carrying out the plausibility checking of the sensor and, when the decalibration of the sensor is detected, the electronic control unit performing reinitialization of the sensor of the rear wheel steering system so that the sensor for detecting the set position of the rear wheel actuator again correctly identifies the rear-wheel steering angle of the rear axle and, when recalibration is not possible, determining that the sensor is faulty, the reference sensor system being part of a vehicle unit, which is separate and distinct from and external to and thus not included as part of the rear wheel steering unit which is associated with the rear axle, the reference sensor system being designed to detect a reference signal that depends on a status of the vehicle, the electronic control unit determining, with reference to the vehicle-status-dependent reference signal, at least one of a reference value and a reference vehicle status, and the electronic control unit carrying out the plausibility check of the sensor by comparing one of the reference value and the reference vehicle status with an actual value of the sensor for detecting the set position of the rear wheel actuator to determine whether or not the sensor for detecting the set position of the rear wheel actuator is functioning correctly, the reference sensor system including at least one environment sensor, being positioned on each side of a vehicle incorporating the assembly, for providing real-time information about a distance of the vehicle from left-hand and right-hand boundaries of a road, and each environment sensor being associated with the vehicle unit to assist with performing the plausibility checking and calibration, and the at least one environment sensor positioned on each side of a vehicle facilitates detection of an orientation of the vehicle relative to the road so that the assembly can determine whether the vehicle is traveling one of parallel or crabwise relative to the road, and when the electronic control unit determines, during the plausibility check of the sensor, that the sensor is not functioning correctly, the electronic control unit initiates recalibration of the sensor so that, following the rough and the fine recalibrations of the sensor, the sensor again correctly detects the set position of the rear wheel actuator, while if the sensor is determined by the electronic control unit to be faulty, then the rear axle steering system is switched off.

* * * * *